United States Patent
Seifert

(10) Patent No.: US 7,073,851 B2
(45) Date of Patent: Jul. 11, 2006

(54) GUIDE RAIL AND ROOF FRAME FOR THE ROOF OPENING SYSTEM OF A MOTOR VEHICLE

(75) Inventor: Wolfgang Seifert, Wielenbach (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/979,225

(22) Filed: Nov. 3, 2004

(65) Prior Publication Data

US 2005/0099036 A1    May 12, 2005

(30) Foreign Application Priority Data

Nov. 6, 2003    (DE) ................. 103 51 734

(51) Int. Cl.
*B60J 7/02* (2006.01)
(52) U.S. Cl. .................... 296/216.08; 16/95 R
(58) Field of Classification Search .......... 296/216.08, 296/223 US, 223; 16/95 R
See application file for complete search history.

(56) References Cited

U.S. PATENT DOCUMENTS

| 5,104,178 | A | | 4/1992 | Bienert |
| 5,993,100 | A | * | 11/1999 | Gastmann .................. 403/292 |
| 6,408,587 | B1 | * | 6/2002 | Cronin et al. ................. 52/637 |
| 6,425,630 | B1 | | 7/2002 | Mathias et al. |
| 6,431,644 | B1 | * | 8/2002 | Nagashima et al. ........ 296/223 |
| 6,601,911 | B1 | | 8/2003 | Imgram et al. |
| 2001/0014251 | A1 | * | 8/2001 | Gastmann .................. 403/331 |

FOREIGN PATENT DOCUMENTS

| DE | 198 21 694 A1 | | 11/1999 |
| WO | WO 02/038407 | * | 5/2002 |

\* cited by examiner

*Primary Examiner*—Dennis H. Pedder
(74) *Attorney, Agent, or Firm*—David S. Safran

(57) ABSTRACT

A guide rail (10) for the roof opening system of a motor vehicle has several lengthwise guide rail segments (12, 14) which are located in succession in the guidance direction (a), and at least one adapter (16) located in a transition area between adjacent guide rail segments (12, 14). The adapter provides for a continuous guide transition (22) between the coaxial guideways (18, 20) of the adjacent guide rail segments (12, 14). In such a guide rail, viewed over the length of the guide rail, guideways and cable channels can also be arranged nonuniformly and the guide rail segments can be made completely individually, especially optimized for the respective area of the task.

17 Claims, 1 Drawing Sheet

GUIDE RAIL AND ROOF FRAME FOR THE ROOF OPENING SYSTEM OF A MOTOR VEHICLE

BACKGROUND OF THE INVENTION

1. Field of the Invention

This invention relates to a guide rail for the roof opening system of a motor vehicle and a roof frame which encompasses the guide rail.

2. Description of Related Art

A guide rail of the type of interest here is used in roof opening systems (for example, a sliding roof), first of all, for holding drive and guide elements (for example, drive cable, sliding block, etc.) for one or more covers which can be displaced for clearing a roof opening. Moreover, such a guide rail can have, for example, water drainage functions within the framework of so-called "water management" of the roof opening system. Finally, with two such guide rails, each of which is located on respective side underneath the roof opening, running parallel to the lengthwise direction of the vehicle, together with a so-called frame front part, and optionally, other components, a frame structure (for example, a sliding roof frame) is often formed. Such a structure, which is also called a roof frame below, can be used advantageously for mechanical stabilization of the vehicle roof and for integration of other components of the roof opening system (for example, electric drive, sensors, water drainage, etc.).

Guide rails for roof opening systems are known, for example, from German Patent DE 40 14 487 C1 (which corresponds to U.S. Pat. No. 5,104,178), German Patent Application DE 199 43 715 A1 (which corresponds to U.S. Pat. No. 6,425,630), German Patent Application DE 198 21 694 A1 and German Patent Application DE 101 44 742 A1 (which corresponds to U.S. Pat. No. 6,601,911). These known guide rails are made in one piece. Thus, the guide rail known from DE 199 43 715 A1 and counterpart U.S. Pat. No. 6,425,630 is made, for example, as a metal section which is cut to the required length. As a result, there arises the advantage of a relatively simple manufacturing capacity, for example, as an extruded section which has been cut to length.

The disadvantage in the known guide rail is that a number of the individual guideway sections and/or cable channel sections are provided, but all of them are not used, for every roof opening system. Aside from the associated material consumption, in practice, this often increases the installation height which is required by the guide rail; this is problematical especially in use for the roof opening system of a motor vehicle. The circumstance that, viewed over the length of the guide rail, all of the existing guideways or cable channels or the like are not always needed leads to the fact that the "sum" of these guideways and cable channels determines (and increases) the installation height of the entire guide rail. Moreover, in a rail which has been simply produced as a rail section, major changes of this section (cross section) over the length of the rail are essentially not possible and/or are associated with considerable reworking effort. Finally, in the guide rails of the known type, complex reworking (for example, cutting) is often necessary in order to match the section of the guide rail to the constricted installation space or to integrate additional parts, such as locking blocks, cranks, etc.

SUMMARY OF THE INVENTION

Therefore, it is a primary object of this invention to devise a guide rail and a roof frame which is formed with it, in which the aforementioned disadvantages are eliminated and especially guideways and cable channels can also be located nonuniformly, viewed over the length of the guide rail.

This object is achieved with a guide rail for the roof opening system of a motor vehicle, the guide rail comprising several lengthwise guide rail segments which are located in succession in the guidance direction, wherein at least one adapter is located in the transition area between the adjacent guide rail segments, and which adapter provides a continuous guide transition between the coaxial guideways of the two guide rail segments and a roof frame which includes such a guide rail.

The basic idea of the invention is to assemble a plurality of guide rail segments using one or more adapters for formation of the guide rail. The adapter provides for a continuous guide transition between at least one of the coaxial guideways of the two guide rail segments which are connected to one another. Aside from this, the two guide rail segments which are connected to one another can be made completely individually, especially optimized for the respective area of the task.

Besides the two guideways which are connected to one another over the continuous guide transition, at least one of the two guide rail segments can have other guideways and/or other cable channels. Of these other guideways or channels, then again, individual ones can be coaxially connected to one another over a continuous guide transition in the adapter.

In a preferred embodiment, at least one pair of guide rail segments which are adjacent to one another is made differently from one another, for example, with a differing number and/or arrangement of guideways and/or cable channels. The adapter here provides the transition of one or more guideways or cable channels which are used equally in several guide rail segments, which transition is required for the operation of the guide rail, by the respective guideways or channels being located coaxially in the two guide rail segments and the adapter.

In a preferred embodiment, the coaxial guideways of the guide rail segments which are adjacent to one another are designed for guidance of the sliding block of the cover movement mechanism of the roof opening system. If such a sliding piece, or even for example, a compressively stiff drive cable runs from one guide rail segment beyond the adapter to the other guide rail segment in a receiving path or guideway, the respective continuous transition, preferably at the junctions between the end of the guideway and the adapter area, or between the guideway ends which directly abut one another, are provided with gentle feed bevels.

In a preferred embodiment, at least one of the two guide rail segments is made as a profile rail segment, especially an extruded profile segment (for example, of a metal, such as aluminum or an aluminum alloy). Thus, the advantage of economical manufacture which is known inherently for a one-piece guide rail from the prior art is transferred to the multi-part guide rail in accordance with the invention. In a preferred development, it is provided that the adapter forms a positive connection with one or with both guide rail segments which are made as a profile rail segment. This can be easily done by the adapter sections which face the respective profile rail segments being made as a profile, each adapted to the profile of the guide rail segments which is to be connected. Intermeshing profile sections on the adapter and on the profile rail segment connected thereto can be used at the same time for centering (in all three directions of space).

To fix the guide rail segments on the adapter, they can be joined to the adapter by screws or by rivets, for example. The material and the "degree of overlapping" of the adapter can be chosen in practice such that the stiffness of the assembled guide rail corresponds to the requirements of the respective roof opening system.

In an advantageous embodiment, it is provided that the adapter is executed to provide additional functions. These additional functions include, for example, placing of other roof frame components, such as guides, locking blocks, switches, outlet lines for drive cables, sensors, water drains, etc., in the area of the guide rail or integrating them into the guide rail. If the guide rail contains a gutter area, the adapter and/or by receiving channels for elastic sealing masses such that, after assembly, watertightness between the rail sections and the adapter is ensured, it can be formed by 2-component injection technique. A roof frame for a roof opening system, for example, a sliding roof frame, in one preferred embodiment, in accordance with the invention, has two of the above described guide rails spaced at a distance from one another and running parallel in the lengthwise direction of the vehicle.

The invention is explained in detail below using one embodiment with reference to the accompanying drawings.

DETAILED DESCRIPTION OF THE INVENTION

Figure 1:
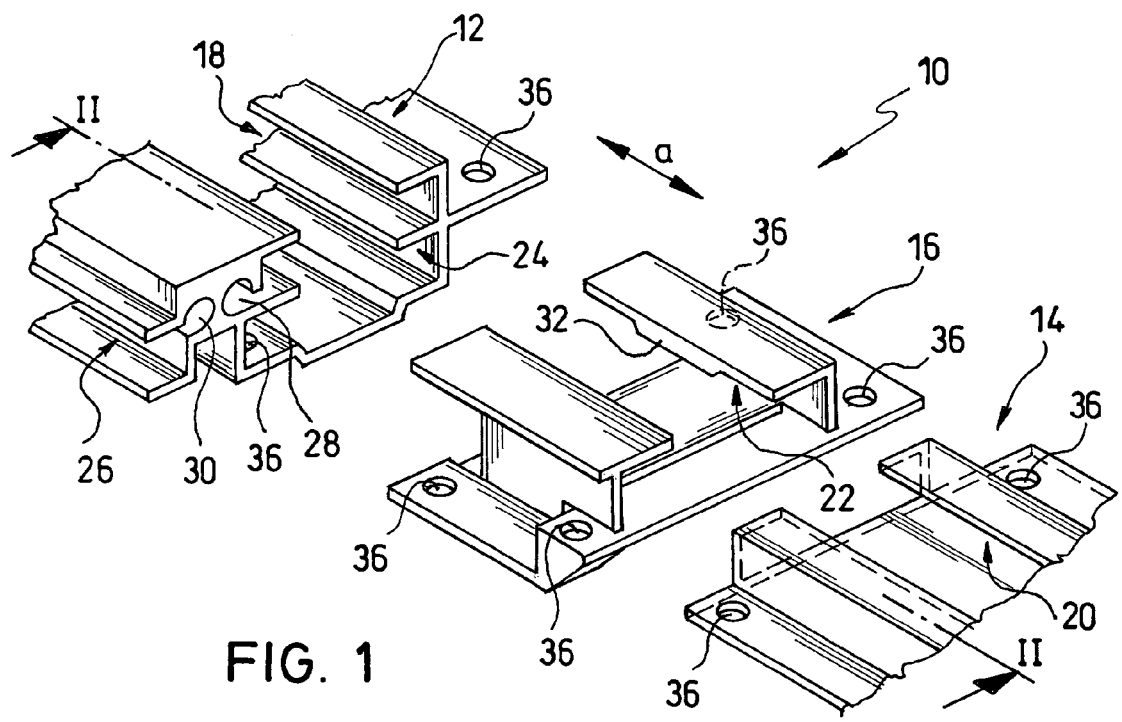
FIG. 1 is a perspective exploded view of a guide rail in the area of the transition from one guide rail segment to another guide rail segment via an adapter piece.

FIG. 1 shows the transition area 10 of a guide rail, from a first rail segment 12 to a second rail segment 14 via an adapter piece 16.

The preferred application for the guide rail 10 has two such rails, 12, 14, as lateral components of a sliding roof frame (not shown), as is described, for example, in the U.S. Pat. Nos. 5,104,178 and 6,601,911, which are hereby incorporated by reference, as well as in German Patent Application DE 198 21 694 A1, all of which were already mentioned initially, and therefore, do not require further explanation.

The guide rail 10 in the illustrated example is formed by the two lengthwise rail segments 12, 14 being located in succession in the guidance direction (double arrow a).

Figure 2:
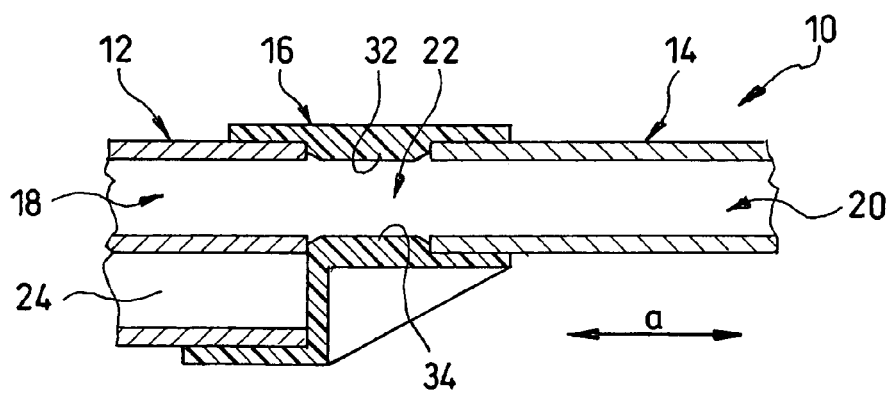
FIG. 2 shows a sectional view along line II—II in FIG. 1 in the assembled state of the guide rail.

As is especially apparent from the lengthwise section shown in FIG. 2, the adapter piece 16 is located in the transition area between the two rail segments 12, 14, which are adjacent to one another and provides a continuous guide transition (adapter guideway 22) between the coaxial guideways 18, 20. The expression "continuous guide transition" is used here to describe the circumstance in which a guide element or drive element (for example, the sliding block of the cover movement mechanism) can move from one of the rail segment guideways 18, 20, via adapter guideway 22, into the other of the two guideways 18, 20. For this purpose, the guideways 18, 20, 22, have a guide profile which is uniform viewed in cross section with a common (coaxial) guide axis. In contrast to the embodiment shown, the adapter piece 16 could, of course, provide still other guide transitions between the coaxial guideways and/or cable channels, etc., of the two rail segments 12, 14.

Preferably, as shown, the profile of the first rail segment 12 differs from the profile of the second rail segment 14. This advantageously takes into account that, in practice, viewed over the length of the guide rail, all guideways or cable channels are not always needed.

In the embodiment shown, the first rail section 12 has two guideways 24, 26 and two drive cable channels 28, 30. These other guideways or channels do not continue over the adapter piece 16, but end at it. Alternatively, the adapter piece 16 could have the corresponding termination or discharge line means for the guideways/channels which end at this point.

The two rail segments 12, 14 are made as an extruded section from an aluminum alloy so that economical production of the guide rail 10 arises. In contrast to the illustrated embodiment, such a rail could also be composed of more than two rail segments (with a corresponding number of adapter pieces) in order, for example, to implement another variation of the number and/or arrangement of guideways and/or cable channels over the length of the rail 10.

It has been found to be especially advantageous if, as shown, the adapter piece 16 forms a positive connection with the two rail segments 12, 14, which are made as a profile rail segment, which imparts to the rail section combination the stiffness for the respective application and which centers the interconnected rail segments (guide direction a) relative to one another in all directions orthogonally to the lengthwise direction of these rail sections (guide direction a). Moreover, in this embodiment, the mutual distance of the two adjacent rail segments 12, 14, is fixed by a defined stop of the rail segment ends on the stop areas 32, 34, of the adapter piece 16 which are provided for this purpose. Advantageously, the stop areas 32, 34 have feed bevels on their ends that face the rail segments 12, 14 which ensure a reliable guide transition at the junctions between the rail segments 12, 14 and the adapter piece 16. Alternatively or in addition, the ends of the rail segments 12, 14 facing the adapter piece 16 can also be beveled.

As is apparent especially from FIG. 2, the installation height of the rail 10 in the second rail segment 14 is determined only by the height of the guideway 20 which is provided there. In this segment, the installation height of the rail is, therefore, advantageously reduced; this is useful in the case of a sliding rail for increasing the head clearance for vehicle passengers. Moreover, in the rail construction which is shown, the material cost is reduced compared to a continuous one-piece guide rail. The number and arrangement of guideways and/or cable channels is optimized in segments for the respective area of the task.

In the illustrated embodiment, the rail segments 12, 14, are each attached to the adapter piece 16 by screws or rivets. FIG. 1 shows the corresponding holes for passage of screws or rivets at 36. In general, it is preferred if the guide rail 10 is pre-mounted in this way from components 10, 14, and 16 and then is used to form a roof opening system frame.

What is claimed is:

1. Guide rail for the roof opening system of a motor vehicle, the guide rail comprising several lengthwise guide rail segments which are located in succession in a guidance direction, wherein at least one adapter is located in a transition area between adjacent guide rail segments, the adapter forming a continuous guide transition between coaxial guideways of the adjacent guide rail segments, the adapter having connector portions at each of opposite ends thereof, each connector portion being configured for overlapping an end of a respective one of said adjacent guide rail segments, and the adapter having a track-forming portion which provides said continuous guide transition, said track-forming portion extending between said connector portions.

2. Guide rail as claimed in claim 1, wherein the coaxial guideways of the guide rail segments provide guidance for a sliding block of a cover movement mechanism of the roof opening system.

3. Guide rail as claimed in claim 1, wherein at least one of the two guide rail segments has at least one additional guideway or cable channel.

4. Guide rail as claimed in claim 1, wherein the guide rail segments have at least one of a differing number and differing arrangement of guideways.

5. Guide rail as claimed in claim 1, wherein the guide rail segments have at least one of a differing number and differing arrangement of cable channels.

6. Guide rail as claimed in claims 1, wherein at least one of the guide rail segments is an extruded profile rail segment.

7. Guide rail as claimed in claim 6, wherein the adapter has a positive connection with at least one of guide rail segments.

8. Guide rail as claimed in claim 1, wherein the continuous guide transition is formed between the coaxial guide rail segments by feed bevels.

9. Guide rail as claimed in claim 1, wherein the adapter is configured for receiving additional roof frame components.

10. Guide rail as claimed in claim 2, wherein at least one of the two guide rail segments has at least one additional guideway or cable channel.

11. Guide rail as claimed in claim 10, wherein the guide rail segments have at least one of a differing number and differing arrangement of guideways.

12. Guide rail as claimed in claim 11, wherein the guide rail segments have at least one of a differing number and differing arrangement of cable channels.

13. Guide rail as claimed in claim 10, wherein the guide rail segments have at least one of a differing number and differing arrangement of cable channels.

14. Guide rail as claimed in claims 10, wherein at least one of the guide rail segments is an extruded profile rail segment.

15. Guide rail as claimed in claim 14, wherein the adapter has a positive connection with at least one of guide rail segments.

16. Guide rail as claimed in claim 14, wherein the continuous guide transition is formed between the coaxial guide rail segments by feed bevels.

17. Guide rail as claimed in claim 14, wherein the adapter is configured for receiving additional roof frame components.

* * * * *